United States Patent [19]
Abbott, Jr.

[11] Patent Number: 4,645,705
[45] Date of Patent: Feb. 24, 1987

[54] TRANSFER COUPON

[75] Inventor: Thomas G. Abbott, Jr., Berwyn, Pa.

[73] Assignee: Scott Paper Company, Philadelphia, Pa.

[21] Appl. No.: 363,369

[22] Filed: Mar. 30, 1982

[51] Int. Cl.[4] .......................... B32B 3/18; B41M 3/12; B44C 1/16

[52] U.S. Cl. ........................................ 428/195; 8/471; 156/234; 156/235; 156/240; 427/148; 428/207; 428/913; 428/914

[58] Field of Search ............... 156/234, 235, 240, 277; 427/148; 428/43, 211, 488, 537, 913, 914, 40, 195, 207, 484, 488.1, 488.4, 537.5; 8/471

[56] References Cited

U.S. PATENT DOCUMENTS

| | | | |
|---|---|---|---|
| 3,013,917 | 12/1961 | Karlan et al. | 156/235 |
| 3,914,471 | 10/1975 | Hamilton et al. | 428/457 |
| 4,089,722 | 5/1978 | Holoubek | 156/235 |
| 4,224,358 | 9/1980 | Hare | 156/235 |
| 4,284,456 | 8/1981 | Hare | 156/235 |

FOREIGN PATENT DOCUMENTS

| | | | |
|---|---|---|---|
| 1420214 | 1/1976 | United Kingdom | 428/457 |

*Primary Examiner*—Bruce H. Hess
*Attorney, Agent, or Firm*—Joseph H. Yamaoka; John W. Kane, Jr.

[57] ABSTRACT

A promotional item (10) comprising a substrate (11) having on one surface (12) thereof a transferable, mirror image (14) of a coupon, said image (14) being capable of being transferred from the substrate (11) to a carrier (15) to form a redeemable coupon.

5 Claims, 6 Drawing Figures

TRANSFER COUPON

TECHNICAL FIELD

This invention relates to a coupon used as a promotional item and more particularly to a coupon that is issued with the coupon image on a substrate in mirror image form, and in which the coupon mirror image can be transferred to a carrier in some manner such as through the application of pressure and/or heat.

BACKGROUND ART

In promoting the sale of consumer products, it is common for a manufacturer to provide consumers with coupons which, when presented to a retail store at the time of purchase of the product, give the consumer a discount from the sale price of the product.

One common method of distributing coupons to the consumer is to have the coupons printed in newspaper advertisements or on advertising inserts that are inserted into and distributed with newspapers. Another common method of distributing promotional coupons is to distribute them at the point of sale by having a large number of coupons bound into a pad and displaying the pad of coupons in the store adjacent to the product being promoted. In both of these cases, the coupon as printed is valid for redemption. The consumer merely presents the coupon to the retail store at the time of purchase and receives a discount from the selling price of the product. The retail store accumulates the coupons received from consumers and sends them to a clearing house. Typically the retail store is paid an amount equal to the discount plus a handling charge for each coupon. The clearing house in turn is reimbursed by the product manufacturer an amount equal to the amount paid to the retail store plus a handling charge for each coupon. One problem with coupons that are valid as issued is that it is relatively easy for either the retail store or a clearing house to mis-redeem coupons. For example, the retail store can accumulate coupons that have not been presented by consumers at the time of a purchase, send these coupons to the clearing house and receive the discount price and handling charge for those coupons even though they were not used by a consumer. Another form of mis-redemption occurs when the clearing house accumulates coupons that have not been sent to them by retail stores, and receives the reimbursement and handling charge for those coupons from the manufacturer.

Thus, it can be seen that it would be desirable to have a coupon that is not valid as issued but requires validation by the consumer prior to use. The additional act of validation represents a form of deterrence to mis-redemption of the coupons by either the retail store or the clearing house.

When coupons are distributed at the point of sale, it is also believed that a coupon that is not valid as issued has a slight advantage over a coupon that is valid as issued. If the coupon is valid as issued, the consumer may take the coupon and use it to obtain a discount on the current purchase. But if the coupon is not valid as issued at the point of sale, the consumer who takes the coupon may make a current purchase at the regular price, and then will validate the coupon to obtain a discount on a subsequent purchase. Thus, the coupon that is not valid as issued may possibly support two separate purchases.

DISCLOSURE OF THE INVENTION

In accordance with this invention there is provided a promotional coupon comprising a substrate having thereon a transferable image of a coupon. The coupon as issued cannot be used by a consumer to obtain a discount from the selling price of a product. In order to validate the coupon, the consumer must perform a validating step which will transfer the image from the issued coupon to a carrier to form a valid coupon which can then be used by the consumer to obtain a discount from the selling price of a product.

In a preferred embodiment of the invention the coupon image is printed on the substrate in mirror image form with an ink that will readily transfer to a carrier when the side of the issued coupon containing the coupon image is placed adjacent to the carrier and heat and pressure is applied to the surface of the coupon that does not contain the coupon mirror image. In another preferred embodiment of the invention, the surface of the carrier member that does not contact the mirror image of the coupon on the substrate contains an iron-on decal of the type commonly used to decorate tee shirts. Thus, when the issued coupon is placed adjacent to the surface of the carrier that does not contain the decal, and the combined coupon and carrier assembly is placed over some material such as a tee shirt, the application of heat and pressure to the coupon and decal carrier assembly will simultaneously cause the decal to transfer from the carrier to the tee shirt and the coupon image to transfer from the coupon substrate to the decal carrier. The decal carrier then serves two purposes, namely that of acting as a carrier for the decal prior to transfer of the decal and acting as the carrier for the validated coupon after transfer of the decal.

BRIEF DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

BEST MODE FOR CARRYING OUT THE INVENTION

Figure 1:
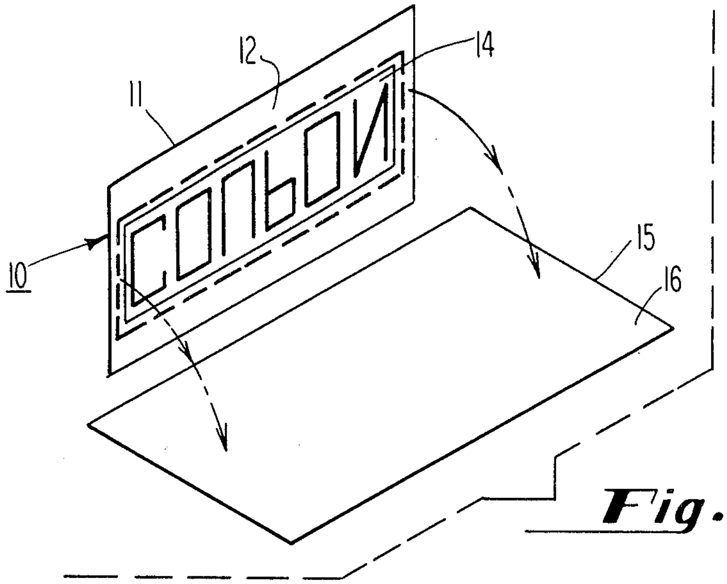
FIG. 1 is a schematic representation of a coupon having a transferable image.
Figure 2:
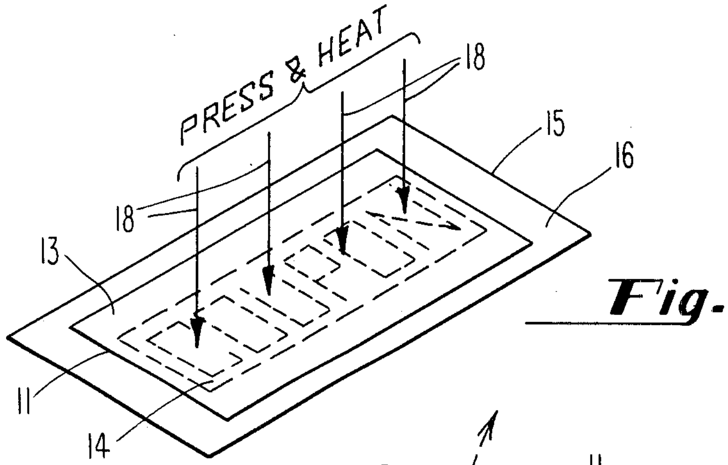
FIG. 2 is a schematic representation of the validating step used in connection with the coupon of FIG. 1.
Figure 3:
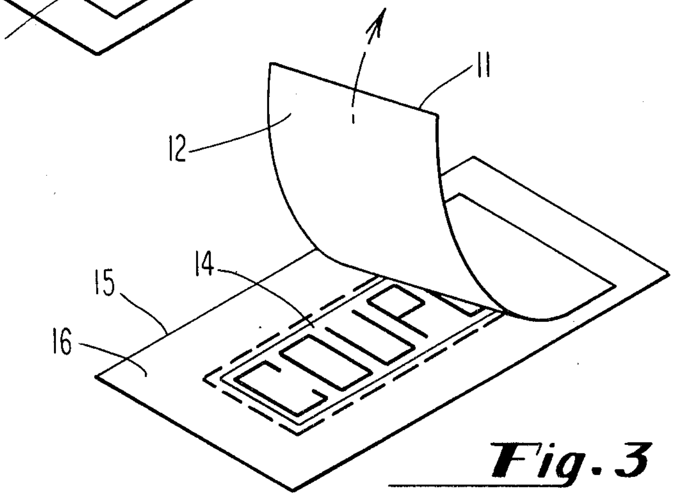
FIG. 3 is a schematic representation of the coupon after the validating step of FIG. 2.

FIGS. 1–3 illustrate one embodiment of my invention. In those figures, there is shown a coupon 10 having a transferable coupon image 14 placed on the bottom side 12 of a substrate 11. The coupon image 14 is placed on the bottom surface 12 so that as one observes the surface 12, the coupon image 14 is in mirror image form. The transfer coupon 10 as issued is not redeemable in this form. In order to validate the coupon it is necessary to transfer the coupon image 14 to the top surface 16 of a carrier 15. In a preferred embodiment, the coupon image 14 is printed on surface 12 of substrate 11 with a sublistatic ink. Sublistatic inks are well known in the art which includes for example U.S. Pat. No. 3,363,557—Blake issued Jan. 16, 1968 and entitled "Heat Transfer of Indicia Containing Sublimable Coloring Agent".

As shown in FIG. 2, to validate the coupon, the transfer coupon 10 is placed so that its bottom surface 12 on which the coupon mirror image 14 is formed is placed over the top surface 16 of the carrier 15. If the coupon mirror image 14 is printed on the surface 12 with a sublistatic ink, the application of heat or heat and pressure, as represented by arrows 18 and which for example can be applied to the top surface 13 of transfer coupon 10 by means of an electric iron, will cause the printed coupon image 14 to be transferred from the bottom surface 12 of the substrate 11 to the top surface 16 of the carrier 15. As shown in FIG. 3, when the coupon substrate 11 is removed, the carrier 15 has a direct coupon image 14 printed on the surface 16 to form a valid coupon capable of being used by a consumer to obtain a discount from the selling price of a purchased product.

When reference is made in this application to a transferable image 14, it is intended to cover other methods for providing a coupon mirror image 14 on the surface 12 of substrate 11. For example, the coupon mirror image 14 could be a decal which when wet can be transferred to the surface 16 of carrier 15.

In the preferred embodiment, both the coupon substrate 11 and the carrier 15 are paper. It is obvious to those skilled in the art that the type of paper used may depend on the process for providing the substrate 11 with the coupon mirror image 14.

Figure 4:
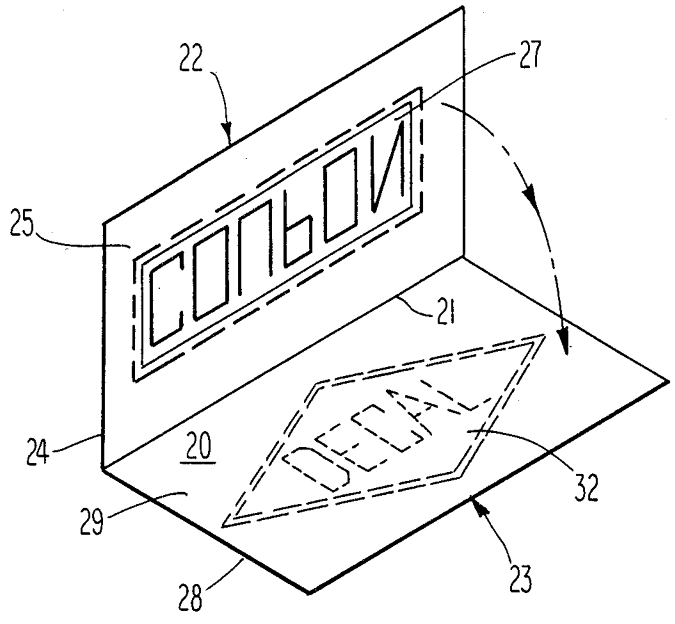
FIG. 4 is a schematic representation of a promotional item including the coupon of FIG. 1.
Figure 5:
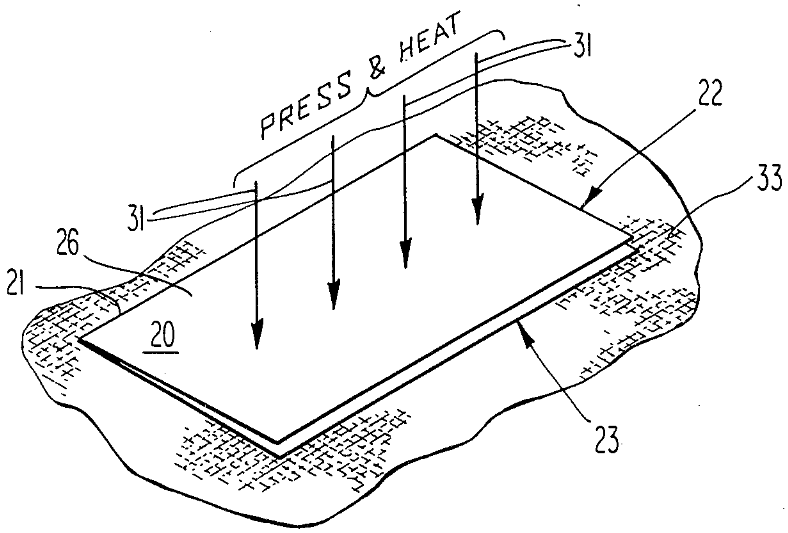
FIG. 5 is a schematic representation of the validation step used in connection with the promotional item of FIG. 4.
Figure 6:
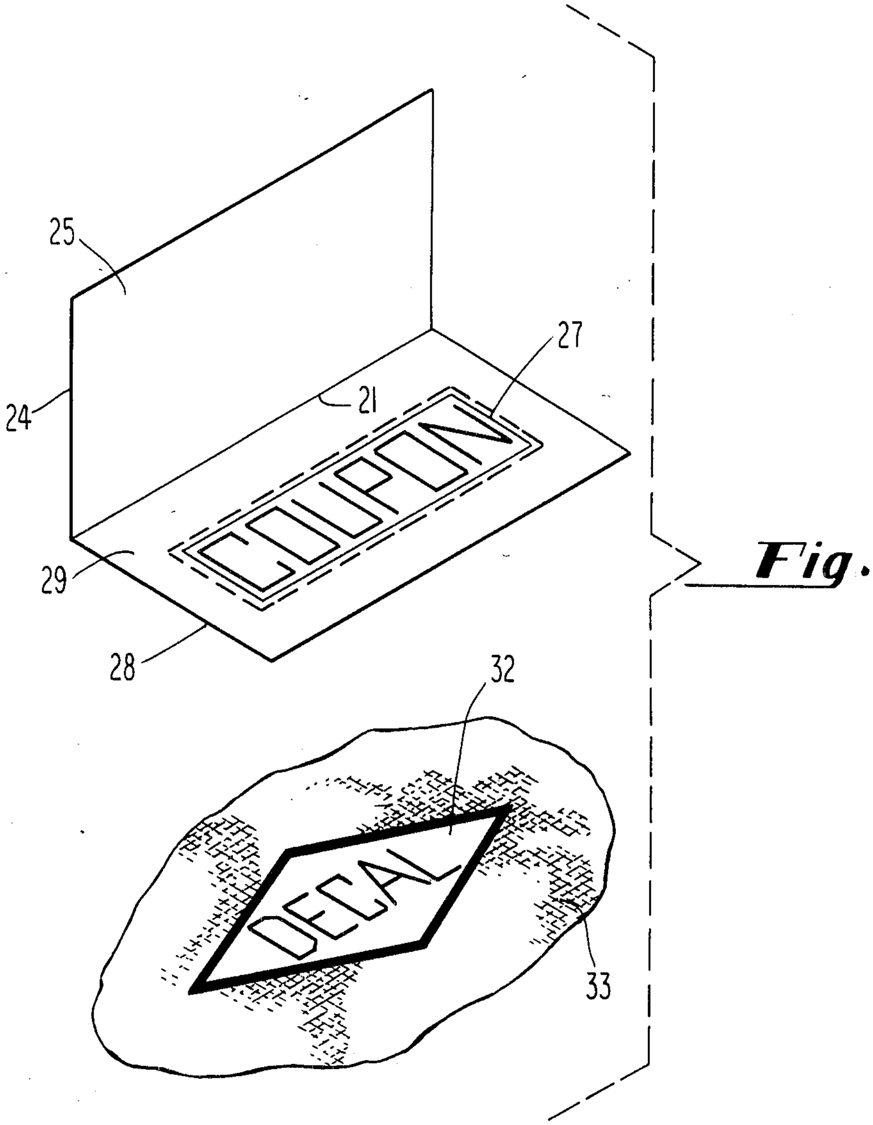
FIG. 6 is a schematic representation of the elements of the invention after the validating step of FIG. 5.

FIGS. 4–6 describe another embodiment of the invention. In this embodiment of the invention, there is shown a promotional item 20 that can be folded at line 21 to form a transferable mirror image coupon portion 22 and a transferable decal portion 23. The transferable mirror image coupon portion 22 consists of a substrate 24, the bottom surface 25 of which has applied thereto a transferable mirror image 27 of a coupon. As mentioned previously, it is preferred that the transferable mirror image 27 be printed using a sublistatic ink. The decal portion 23 of promotional item 20 consists of a carrier 28 having a bottom surface 30 to which is applied a transferable decal 32. In a preferred embodiment of the invention, the decal portion 23 of promotional item 20 is an iron-on transfer decal which is widely used for decorating tee-shirts.

As now shown in FIG. 5, the promotional item 20 is folded at line 21 so that the transferable coupon mirror image 27 overlies the top surface 29 of decal carrier 28. As shown in FIG. 5 the folded promotional item 20 is placed over a decal receiving material 33. Heat and pressure, represented by arrows 31, are applied, for example, by means of an electric iron, to the top surface 26 of the coupon substrate 24 which simultaneously causes the decal 32 to be transferred to the decal receiving material 33 and the transferable coupon mirror image 27 to be transferred to the top surface 29 of decal carrier 28. As shown in FIG. 6, after transfer, the coupon image 27 exists in direct image form on the top surface 29 of the decal carrier 28 and can be used by a consumer to obtain a discount from the retail price of a product.

It will be appreciated by those skilled in the art that the transferable mirror image coupon portion 22 of the promotional item 20 does not have to be joined to the decal portion 23 of the promotional item 20 but can be two separate members. Furthermore, it is not necessary for the transfer of the coupon mirror image 22 to the top surface 29 of decal carrier 28 to occur simultaneously with the transfer of the decal 32 from the bottom surface 30 of decal carrier 28 to the decal receiving material 33. In other words, heat and pressure could be first applied to the top surface 29 of decal carrier 28 to effect transfer of the decal 32 to the decal receiving material 33. Then at a later time the coupon mirror image portion 22 of the promotional item 20 can be placed over the top surface 29 of the decal carrier 28 and heat or heat and pressure applied to the top surface 26 of the coupon substrate 24 to cause a transfer of the coupon mirror image 27 from the coupon substrate 24 to the top surface 29 of the decal carrier 28.

While the present invention has been described with reference to specific embodiments thereof, it will be obvious to those skilled in the art that various changes and modifications may be made without departing from the invention in its broader aspects.

What is claimed as new and desire to be secured by Letters Patent of the United States is:

1. A promotional item comprising:

(a) a substrate having on one surface thereof a transferable mirror image of a coupon;

(b) a carrier having first and second opposed surfaces; and (c) a transferable decal applied to said second surface of the carrier sheet; wherein the first surface of the carrier is positionable to underlie the transferable image of the coupon and a decal receiving material is positionable to underlie the decal so that during a transfer process the decal is transferred to the decal receiving material and the coupon image is transferred to the first surface of the carrier to form a redeemable coupon.

2. A promotional item as recited in claim 1 wherein the coupon image and the decal are transferred by applying pressure on the surface of the substrate opposed to said one surface of the substrate.

3. A promotional item as recited in claim 1 wherein the coupon image and the decal are transferred to the carrier by the application of heat and pressure to the surface of the substrate opposed to said one surface of the substrate.

4. A promotional item as recited in claim 1 wherein the coupon image is printed using a heat transferable ink.

5. A promotional item as recited in claim 1 wherein the coupon image and the decal are transferred simultaneously.

* * * * *